US008010724B2

(12) United States Patent
Wortham et al.

(10) Patent No.: US 8,010,724 B2
(45) Date of Patent: Aug. 30, 2011

(54) I2C/SMBUS LADDERS AND LADDER ENABLED ICS

(75) Inventors: Jason Allen Wortham, Fremont, CA (US); Urs H. Mader, Cupertino, CA (US); Yi-Chang Hsieh, San Jose, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 10 days.

(21) Appl. No.: 12/574,202

(22) Filed: Oct. 6, 2009

(65) Prior Publication Data
US 2011/0082955 A1 Apr. 7, 2011

(51) Int. Cl.
*G06F 13/00* (2006.01)
(52) U.S. Cl. ......... 710/110; 710/305; 710/306; 713/320
(58) Field of Classification Search .................. 710/110, 710/100, 305–306; 713/320
See application file for complete search history.

(56) References Cited

U.S. PATENT DOCUMENTS

| 6,981,081 | B2* | 12/2005 | Stevens et al. ................. 710/113 |
| 7,380,042 | B2* | 5/2008 | Wang et al. .................... 710/305 |
| 2009/0157929 | A1* | 6/2009 | Pigott et al. ................... 710/110 |

OTHER PUBLICATIONS

"UM10204 I²C-bus specification and user manual", Rev. 03, NXP Semiconductors, (Jun. 19, 2007), pp. 1-50.
"System Management Bus (SMBus) Specification", Version 2.0, SBS Implementers Forum, (Aug. 3, 2000), pp. 1-59.
"The I²C-Bus Specification", Version 2.1, Philips Semiconductors, (Jan. 2000), pp. 1-46.

* cited by examiner

*Primary Examiner* — Glenn A Auve
*Assistant Examiner* — Kim T Huynh
(74) *Attorney, Agent, or Firm* — Blakely Sokoloff Taylor & Zafman LLP

(57) ABSTRACT

I2C/SMBus ladders and ladder enabled ICs (devices) to enable daisy-chained I2C/SMBus communication. The devices are particularly useful in monitoring and/or servicing high-voltage battery stacks and other voltage stacks. The devices are powered from a respective voltage increment in the voltage stack, and include level shifting circuitry so as to be operative with an input voltage up to the breakdown voltage of the level shifting circuitry. Various features are disclosed, including but not limited to a unique data line drive, capacitive coupling between devices in a daisy chain with line clamps for circuitry protection and capacitive coupling charge wiping, and clock stretching to accommodate chain latency.

11 Claims, 4 Drawing Sheets

FIG. 3A

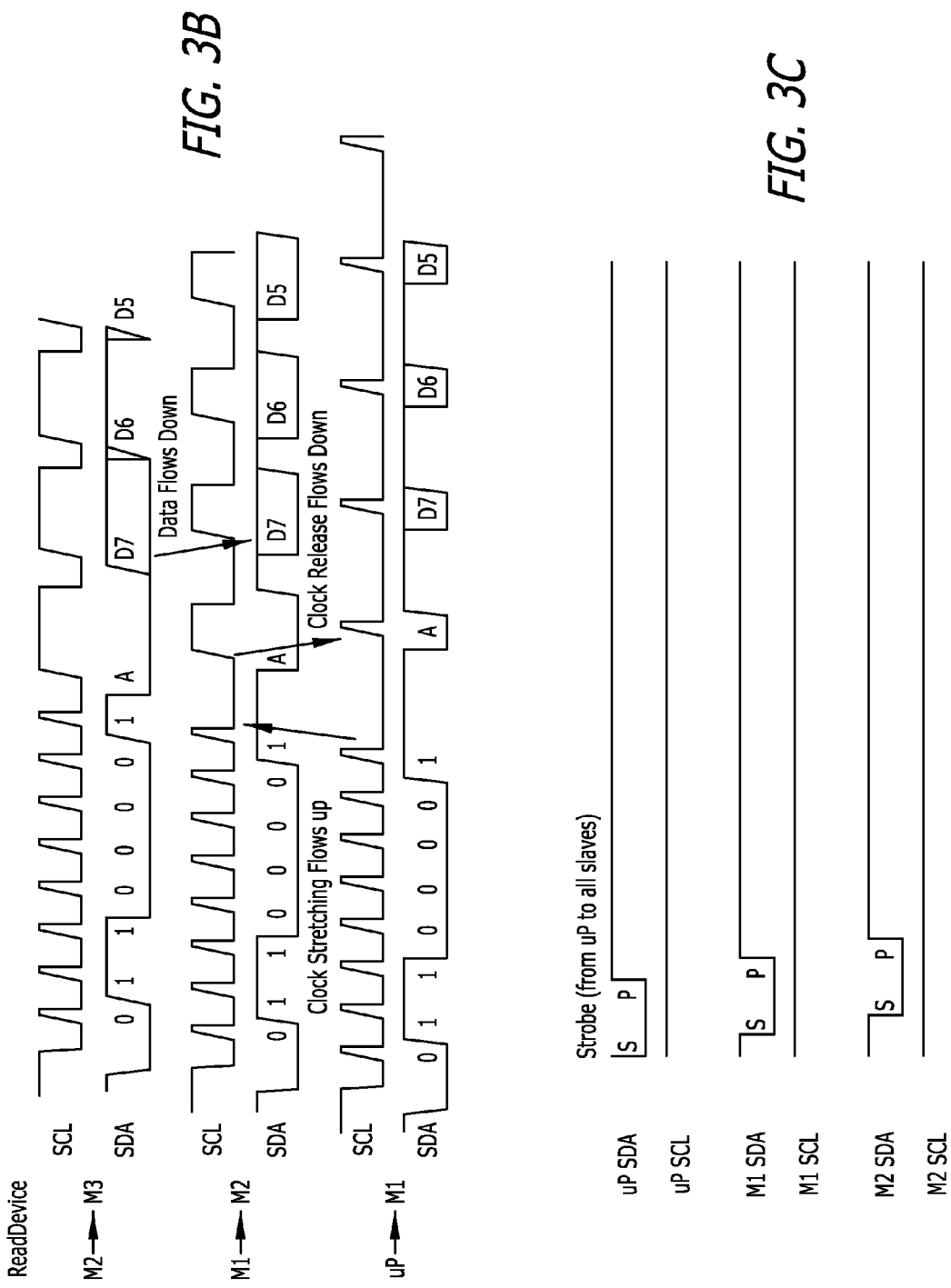

I2C/SMBUS LADDERS AND LADDER ENABLED ICS

BACKGROUND OF THE INVENTION

1. Field of the Invention

The present invention relates to the field of bus structures and methods.

2. Prior Art

I²C is a multi-master serial computer bus invented by Philips that is used to attach low-speed peripherals to a motherboard, an embedded system or a cellphone. The name stands for Inter-Integrated Circuit.

The System Management Bus (abbreviated to SMBus or SMB) is a simple two-wire bus used for communication with low-bandwidth devices on a motherboard, especially power related chips such as a laptop's rechargeable battery subsystem. Other devices might include temperature sensors and lid switches. A device can provide manufacturer information, indicate its model/part number, save its state for a suspend event, report different types of errors, accept control parameters, and return status. The SMBus is generally not user configurable or accessible. The bus was defined by Intel in 1995. It carries clock, data, and instructions and is based on Philips' I²C serial bus protocol. Its clock frequency range is 10 kHz to 100 kHz. Its voltage levels are different from those of I²C, but devices belonging to the two systems are often successfully mixed on the same bus. The SMBus has an extra optional signal called ALERT#, which can be used by slaves to send an interrupt request to the controller.

These two buses are bi-directional buses using a bi-directional clock line and a bi-directional data line, both pulled high by pull-up resistors unless pulled low by one or more devices on the bus. In general, the I2C bus and SMBus are compatible, but there are some subtle differences between the two. When devices are stacked, however, such as may be required in high-voltage battery stack monitors for example, the required support circuitry is expensive and large, requiring many optocouplers and microcontrollers to manage the pack-to-pack communication.

For reference purposes, The I2C-Bus Specification, version 2.1, January 2000 and the System Management Bus (SMBus) Specification version 2.0, Aug. 3, 2000 are incorporated herein by reference.

BRIEF DESCRIPTION OF THE DRAWINGS

FIGS. 3A through 3C are diagrams illustrating the timing of various operations for a daisy chain connection of multiple devices of the present invention.

DETAILED DESCRIPTION OF THE PREFERRED EMBODIMENTS

The I2C/SMBus Ladders of the present invention are communication systems to enable daisy-chained I2C/SMBus communication. This eliminates expensive opto-couplers in many applications, particularly high-voltage battery stacks typically seen in automotive or battery backup systems. A new breed of Lithium battery is enabling high power and high energy packs, and the typical support circuitry for conventional I2C/SMBus communication devices is expensive and large, requiring many optocouplers and microcontrollers to manage the pack-to-pack communication. The present invention is also useful in other voltage stacks, such as found in super capacitors, fuel cells and solar cells.

I2C/SMBus standards and common devices for communicating on these bus systems are very well known (see the specifications previously identified and incorporated herein by reference), and accordingly the present disclosure will concentrate on the aspects of the present invention that differ from common prior art devices and their communication protocol. The information communicated will of course depend on the application, and may be gathered, formatted, etc. in the same manner as in the prior art. In the case of rechargeable batteries, the information would normally include individual cell voltage and temperature.

Figure 1:
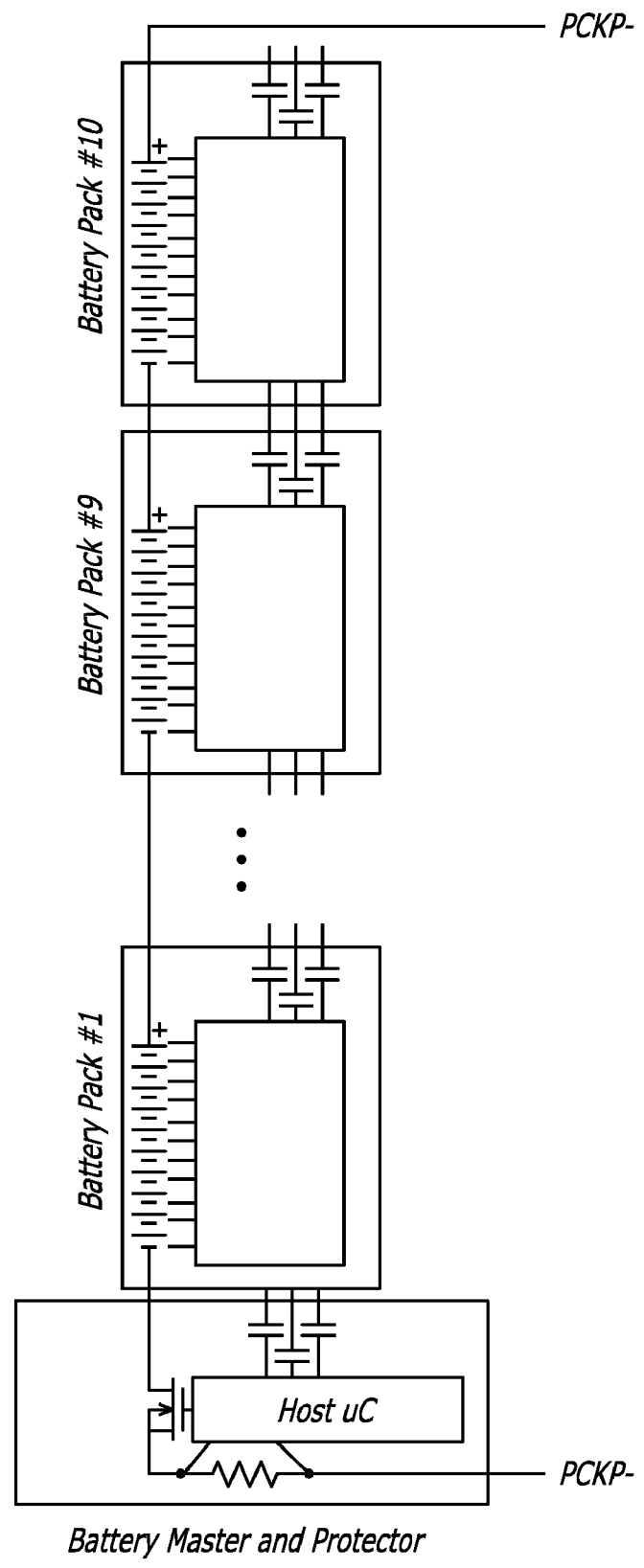
FIG. 1 illustrates the daisy chaining capability of devices in accordance with the present invention as may be used to monitor voltage stacks, such as series connected batteries and battery cells.

FIG. 1 illustrates a typical application of the present invention I2C/SMBus ladder enabled ICs. As shown therein, the ICs may be daisy chained in a high voltage battery stack. Each IC bridges a number of cells in a larger battery stack, the first being coupled to a host microcontroller. As shall be subsequently seen, the daisy chains of the present invention differ somewhat from conventional daisy chains in that each device re-calculates values such as PEC (packet error checking) values and data-check bytes, and level shifts and relays the received data and its data with the new PEC values and data-check bytes to the next device in the chain. In particular, PEC is currently used in SMBus systems. However, on a standard system, in any given SMBus query, there is only one PEC, typically checked at each device, but not recalculated. But on the SMBus ladder of the present invention, the PEC is different at every device in the chain because the preceding bitstream is different for each stage. For example, in a 10-device read-all command, device #10 slave generates a PEC based on only 2 bytes of data. Device #09 slave verifies the PEC value it receives and generates a completely different PEC based on 4 bytes of data. Device #08 verifies the PEC value it receives and generates yet a third PEC based on 6 bytes of data, an so on, with device (total−N) generating N*2 bytes and the corresponding PEC. The PEC verifies the individual links, so there are 10 different PECs generated and 10 different verifications. A mechanism is provided to verify that every link was happy with its result, or the data is not passed on.

Figure 2:
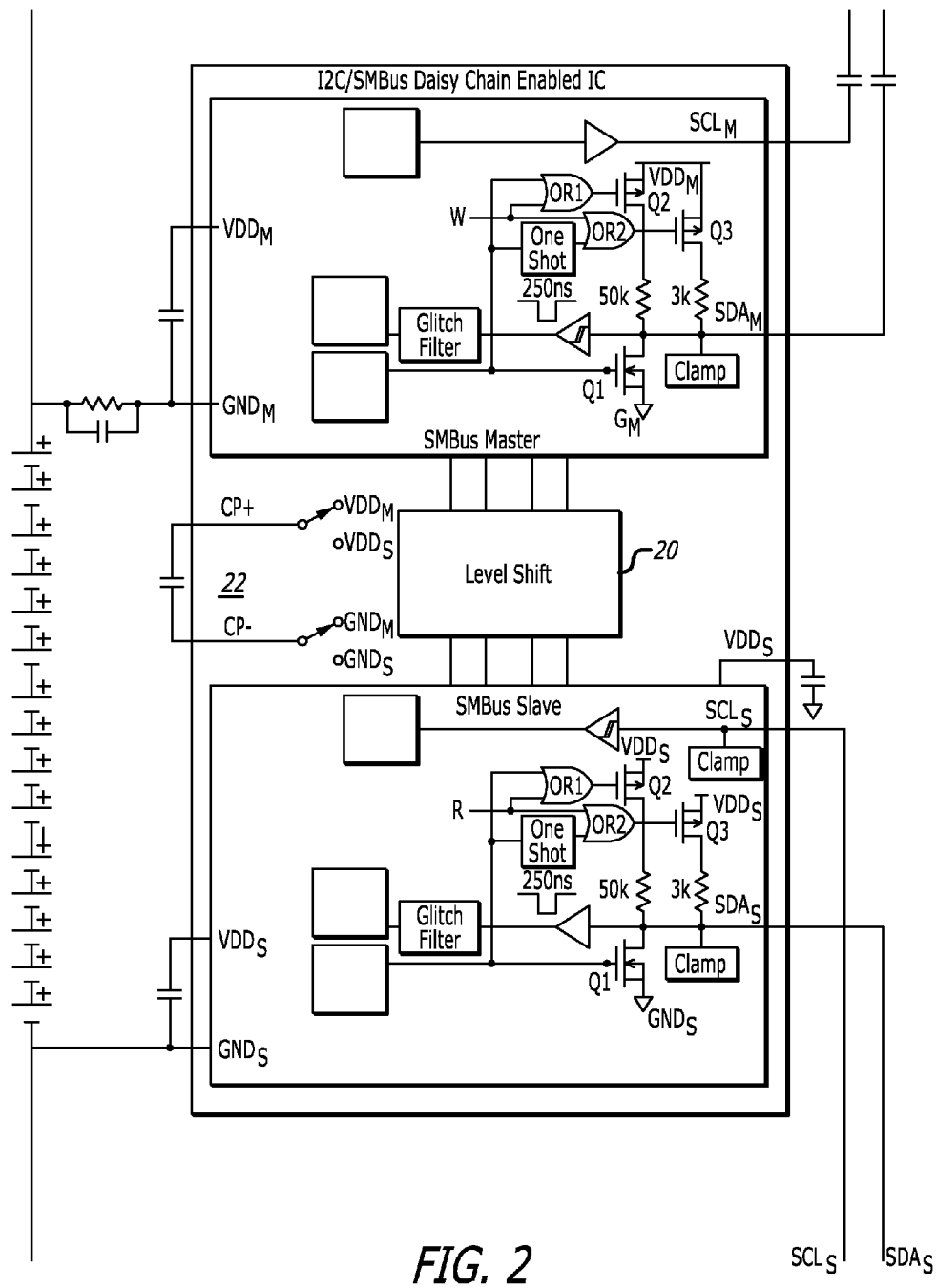
FIG. 2 illustrate certain details unique to devices in accordance with a preferred embodiment of the present invention.

FIG. 2 is a diagram illustrating an exemplary embodiment of the present invention I2C/SMBus ladder enabled ICs in an exemplary application. The circuit is powered from each end of the respective battery stack segment, here labeled $GND_M$ and $GND_S$. The IC itself is comprised of an upper portion and a lower portion, separated by conventional level shifting circuitry 20. The lower portion is referred to as a slave and the upper portion is referred to as a master, in that the lower portion of each IC is the slave to the master portion of the IC below it, or the microcontroller if it is the first IC in the stack.

Master and slave portions of each IC are separately powered. For the slave portion in a preferred embodiment, the ground terminal is the lower end of the battery stack segment $GND_S$, with the relatively low voltage positive power $VDD_S$ for the slave portion being derived from the voltage across the battery stack segment. For the master portion, the ground terminal is the lower end of the battery stack segment $GND_M$, with the relatively low voltage positive power for the master portion being derived from the slave power supply by a charge pump, generally indicated by the numeral 22. As such, the maximum input voltage ($GND_M$-$GND_S$) will be determined by the breakdown voltage of the transistors used in the level shift circuitry.

In FIG. 2, $SDA_S$ and $SCL_S$ are the data and clock lines respectively. These lines are capacitively coupled between adjacent ICs in the stack. Also in FIG. 2, only the interface circuitry is shown, as the rest of the circuitry and its function may be of conventional design, but for the level shift between the two portions of the IC. For a signal being passed down the ladder on the $SDA_M$ line to the IC shown, the signal passes through a Schmidt trigger and Glitch Filter, through the level shift and on down the ladder on the $SDA_S$ line. The delay between input and output for a bit going up or down the ladder is a small fraction of a bit time (see FIG. 3C). For an outgoing signal going up the ladder, when the $SDA_M$ line is to be pulled low, transistor Q1 is turned on. When the line is to be pulled high, OR gate OR1 turns on transistor Q2 to couple a 50K pull-up resistor to the line. At the same time, OR gate OR2 triggered the ONE SHOT circuit, which pulses transistor Q3 on for 250 ns to couple a 3K pull-up resistor to the line for the 250 ns. This provides a much faster (lower impedance) momentary pull-up, with the 50K resistor sustaining the high state on the line unless pulled down by another device on the bus. The same effect is obtained in response to a write signal W that may be applied to the $SDA_M$ line for data originating with that IC. The clamp, which may be a Zener diode, merely limits the upper voltage swing on the $SDA_M$ line, the lower voltage swing being limited by parasitic diodes in the IC. This provides protection against a charge, or lack of charge on the coupling capacitors of FIG. 2 when a battery pack is replaced, and clears the accumulation of charge on the capacitors due to bus contention during an acknowledge. The clock line $SCL_M$ output in one embodiment is simply buffered using a push-pull output, though an open drain implementation may also be advantageously used, as described below.

The interface circuitry for the $SDA_S$ line is the same as the interface circuitry for the $SDA_M$ line, as either line can send and receive information on the respective line. The clock line SCLs however, has a protective clamp, to limit the voltage swing on the line to protect the input to the Schmidt trigger. Note that the signals are effectively regenerated at each IC, maintaining signal and clock quality, relative timing and duration independent of signal direction.

A Ladder of the present invention devices has a protocol definition as well as an analog definition as follows:

The master clock can either be push/pull CMOS or open drain as in a traditional SMBus. If the clock is open-drain, then clock-stretching can be implemented, illustrated in FIG. 3B for the ReadDevice command. In clock stretching, an addressed slave device may hold the clock line low after receiving a bit, indicating that it is not ready to process more data. The master that is communicating with the slave will attempt to raise the clock to send out the next bit, but must verify that the clock line was actually raised. If the slave is clock stretching, the clock line will still be low, as ICs can sink current to ground stronger than the pull-up resistors can provide it. Without clock-stretching, the ReadDevice command is not supported, and is replaced by ReadAll commands, respectively, such commands being described below. Clock-stretching allows for "Shrink-to-fit" timing during any read command, since the stage-delay is automatically managed by the stretched clock (see FIG. 3B). This is equivalent to section 4.3.3 Clock Low Extending, described starting on page 22 of the SMBus Specification hereabove referred to, though in the SMBus Specification is used to allow communication between devices having different speed capabilities, while in the present invention, is used to accommodate the ladder chain latency.

The present invention supports Auto Addressing, which requires a change in the use of the address byte for a daisy-chain system. This change is still compatible with having traditional I2C/SMBus ICs on the bus, but requires a reversal in the address bits for any daisy-chained device to allow successive increment of the address, IC to IC, without having to wait for reception of the full address. The address byte is managed according to Table 1.

TABLE 1

Address Byte

| BIT | NAME | DESCRIPTION |
|-----|------|-------------|
| D7 | 1 | This bit is always 1 to indicate communication to the IC. If this bit is zero, the communication is intended for a different device, and the IC will simply forward the message through the chain. This frees address 0x00 to 0x7F. |
| D6 | ALL | Set ALL = 1 increments the address and forwards the command. This function also configures the slave addresses. Each device in the chain increments the address and forwards the command. Set ALL = 0 to forward the command only to one specific address. |
| D5 | Addr1 | Because of the requirements for pack auto-addressing the address bits are coded in reverse order to allow incrementing the address without waiting to receive the complete address. |
| D4 | Addr2 | |
| D3 | Addr3 | |
| D2 | Addr4 | |
| D1 | Addr5 | |
| D0 | R/W | 1 for Read command, 0 for Write command |

Figure 3A:
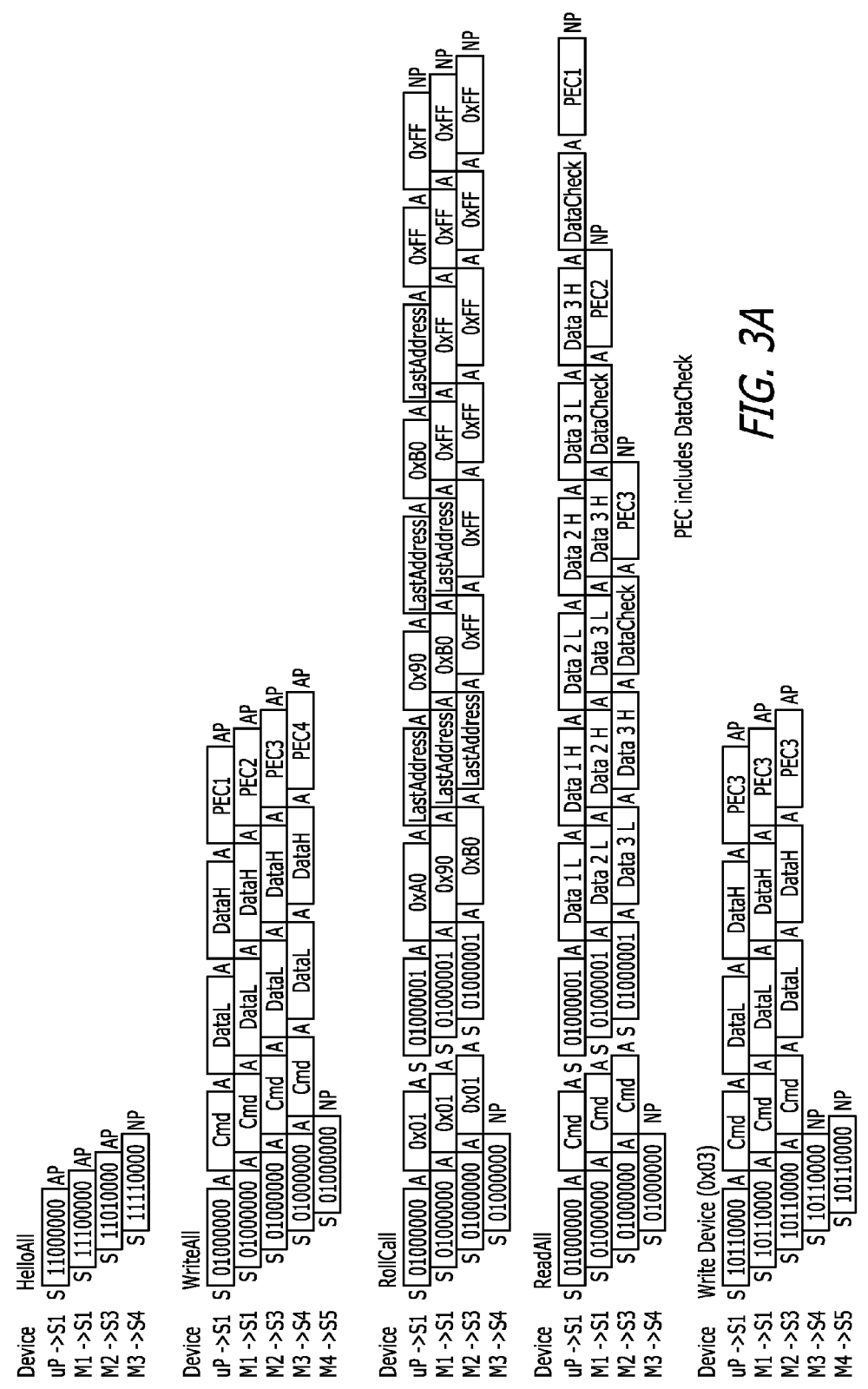

Various aspects of the protocol are discussed below and illustrated in FIGS. 3A-3C, as follows:

Auto-Addressing

The "HelloAll" command or any "WriteAll" or "ReadAll" command (FIG. 3A) automatically assigns (or refreshes) sequential addresses to each device in the chain. (Note that in all three cases, D7 and D6 in Table 1 are set to 1.) These addresses can then be used during a "WriteDevice" command to write to only one selected device in the daisy-chain.

However, for PEC management during ReadAll, it is required for each device to also understand how many devices follow itself in the chain. It is also required for the host to understand how many total devices are in the chain. This allows the host (and each intermediary device) to properly locate the PEC byte at the end of the data stream. Each intermediary device must also recognize the received PEC byte, so it can verify data integrity. For this reason, the "Roll-Call", or "ReadAll Address" command (see FIG. 3A) is special.

Pack Insertion & Removal

When a battery pack and its IC is removed or inserted, the alert line, not shown, will stop pulsing, to indicate an alert. The host should perform a "RollCall" command to determine how many devices are now on the bus. Simultaneously each device will automatically receive a new (same or different) address. Each device will report its address (in the same format normally used for addressing, with LSB first). The last IC in the ladder, after reporting its address and not detecting another IC in the ladder, will report 0xFF. When 0xFF is reported, the last device has been found. This indicates to the host that there are no more devices.

After the host has determined the device count, it should send a SetDeviceCount command (a type of WriteAll command). This informs each device about how many devices follow, so that each device knows when to generate or expect a PEC. Note that a failed PEC could also indicate a change in the number of devices.

Communication Timeout

If the $SCL_S$ input remains high or low for longer than 10 ms, then any transaction is aborted, and the device behaves as if it observed a stop-condition. The host can assure that all devices are in a "ready-to-communicate" state by remaining idle for longer than 10 ms.

Managed Pullups $SDA_M$ and $SDA_S$ are a managed open-drain system. Effectively, the SDA line is only driven during certain bits, and the pullup is not driven when the pulldown is driven. This behaves virtually like CMOS logic, since the pull-up and pull-down devices are not normally in contention. During any write phase, the $SDA_M$ line uses its pullup (unless the pulldown FET is on), and during a Read phase, the $SDA_S$ line uses its pullup. Additionally, the host can have a normal pullup. During the ACK bit of any write phase, the master and slave are in contention, since the master drives its pullup but the slave can pull low for ACK. This will cause some charge to accumulate on the IC to IC coupling capacitors (see FIG. 2). Since this can only occur for one bit per byte, there will be very little charge accumulated on the coupling capacitors, provided the RC time-constant between the pullup resistors and the coupling capacitors is several times larger than the maximum ACK bit length.

The only bit contention times occur during the acknowledge bits. During an acknowledge, the side receiving the acknowledge must utilize its own pullup to listen, because there is no guarantee that the other side is even present to talk.

Active Edge

When the $SDA_M$ is in write mode (W bit is set), or SDA is in read mode, the data line has an active pulldown, and is driven for the first 250 ns with a fast 3 k pullup. During the rest of the write phase the 50 k pullup is used to maintain the DC state. This fast edge allows for fast communication, while the slower 50 k reduces the contention across the coupling capacitor during the acknowledge bit (where one side drives low and the other side uses it's pullup to listen).

The present invention eliminates expensive opto-couplers in many applications, particularly high-voltage battery stacks typically seen in automotive or battery backup systems. A new breed of Lithium battery is enabling high power and high energy packs, and the typical support circuitry is expensive and large, requiring many optocouplers and microcontrollers to manage the pack-to-pack communication. Analog features of the invention include:

Rejection of DC voltage differences between packs. The magnitude of voltage tolerance is defined by the coupling capacitors.

Clock and data signals are regenerated at each node of the chain, which maintains signal integrity.

Level shifting will be cleanly performed inside of a controlled integrated circuit environment.

$GND_M$ and $VDD_M$ are "firm-connected" through a capacitor to the ground $GND_S$ of the upper neighbor. This capacitor connection provides front-end power-supply rejection for pack voltage variation and pack-to-pack AC voltages.

$GND_M$ and $VDD_M$ are generated by a charge pump from $GND_S$ and $VDD_S$. $GND_M$ is DC linked to PCKP, so the voltage at $GND_{M1}=GND_{S2}$, and $VDD_{M1}=VDD_{S2}$, although these voltages do not need to be exactly equal.

Capacitive coupling insures DC blocking between interfaces, which improves high voltage tolerance at the interface.

The system has a maximum frequency, due to the SCL/SDA pullup resistors. The exemplary embodiment achieves >200 kbps data rate, including 250 ns glitch-filtering.

Pullup resistors are managed to reduce contention time, defined as the time when one side of a coupling capacitor is pulled to a different state than the other side of the coupling capacitor. By reducing contention to only the ACK bit, the required value of the coupling capacitors is reduced.

The system has a minimum frequency. Because of the managed pullup resistors, the only time there is any bit contention across a coupling capacitor is during a ACK/NACK read. The receiving side must use its pullup, while the transmitting side pulls down (or doesn't). This bit contention eventually creates a voltage across the coupling capacitor which will reduce noise margin on the following bits. This capacitor voltage is cleared with the clamp circuits at the communication pins.

Packet Error Checking is incorporated for tolerating communication errors.

Daisy chain ladders of the present invention have several key features. In particular:

Each stage is DC isolated by capacitors.

The devices are "auto-addressed" according to their sequence in the chain.

The invention supports "shrink-to-fit" timing using a clock echo. "Shrink-to-fit" means that communication exactly fits the chain latency.

The protocol supports broadcast read and write to maximize the use of the bus.

Supply and common-mode rejection occurs inside the IC, and is not dependent on external components.

The protocol is robust, noise immune, and fault tolerant.

The present invention ICs may be realized in conventional integrated circuitry, or through the use of onboard software controlled hardware in each IC operated under stored program control. While a preferred exemplary embodiment of the present invention has been disclosed and described herein for purposes of illustration and not for purposes of limitation, it will be understood by those skilled in the art that various changes in form and detail may be made therein without departing from the spirit and scope of the invention. Similarly, the invention may be practiced without using the specific circuitry or the entire protocol set forth herein.

What is claimed is:

1. An I2C/SMBus compatible device comprising:
an integrated circuit having;
    first and second power input terminals, the second power input terminal for connecting to a higher voltage than the first power input terminal;
    a first integrated circuit portion forming a slave section powered by a voltage from the first terminal and a voltage derived from the voltage on the second terminal, the slave section having an $SDA_S$ data line and an $SCL_S$ clock line for receiving and sending data and clock signals respectively;
    a second integrated circuit portion forming a master section powered by a voltage from the second terminal and a voltage derived from the slave section power by a charge pump, the master section having an $SDA_M$ data line and an $SCL_M$ clock line for receiving and sending data and clock signals respectively;
    the first integrated circuit portion and the second integrated circuit portion being coupled by level shift circuitry for passing clock and data signals between the master and slave sections;
    whereby a plurality of the devices may be electrically stacked with each successive device having its first terminal coupled to the second terminal of the prior device in the stack.

2. The device of claim 1 wherein when a plurality of the devices are electrically stacked, each device is configured to verify packet error check (PEC) values it receives and to calculate new PEC values for the data relayed to the next device in the daisy chain.

3. The device of claim 1 wherein the first and second integrated circuit portions each maintain signal and clock quality, relative timing and duration independent of signal direction propagated through the device.

4. The device of claim 1 further comprising voltage clamps on the $SDA_S$ data line, the $SCL_S$ clock line and the $SDA_M$ data line, whereby when multiple devices are capacitively coupled in an electrical stack, the $SDA_S$ data line, the $SCL_S$ clock line and the $SDA_M$ data line are protected against a charge buildup on the capacitive coupling.

5. The device of claim 4 further comprising a voltage clamp on the $SCL_M$ data line, whereby when multiple devices are capacitively coupled in a daisy chain, the $SCL_M$ clock line is protected against a charge buildup on the capacitive coupling.

6. The device of claim 1 wherein the device is configured to receive additional data inputs on other lines, and the slave section is configured to transmit the additional data using the $SDA_S$ data line and an $SCL_S$ clock line of its slave portion.

7. The device of claim 1 wherein the device has an autoaddressing capability, whereby when multiple devices are connected in a daisy chain to a controller, upon receipt of a first command from the controller, each device will assign itself an address in a sequence of addresses in accordance with its position in the daisy chain and report its address to the controller, the last device in the daisy chain also reporting that it is the last device in the daisy chain.

8. The device of claim 1 wherein the device includes packet error correction.

9. The device of claim 8 wherein in response to a second command, the device is informed of how many devices follow the device in the daisy chain.

10. The device of claim 1 wherein the $SDA_M$ data line is in write mode or the $SDA_S$ line is in read mode, the respective data line has an active pulldown, and in pullup, is initially driven through a relatively low pullup resistance, and during the rest of the write phase, is driven through a relatively large pullup resistance.

11. The device of claim 1 wherein the device includes the capability of clock stretching during a read operation to accommodate the ladder chain latency when multiple devices are connected in a daisy chain.

* * * * *